Sept. 2, 1969 R. A. HEISLER 3,464,462
EAR INSPECTION AND DETECTION APPARATUS
Filed Oct. 18, 1967 2 Sheets-Sheet 1

INVENTOR.
RAYMOND A. HEISLER
BY
Ralph R. Roberts
AGENT.

Sept. 2, 1969 R. A. HEISLER 3,464,462
EAR INSPECTION AND DETECTION APPARATUS
Filed Oct. 18, 1967 2 Sheets-Sheet 2
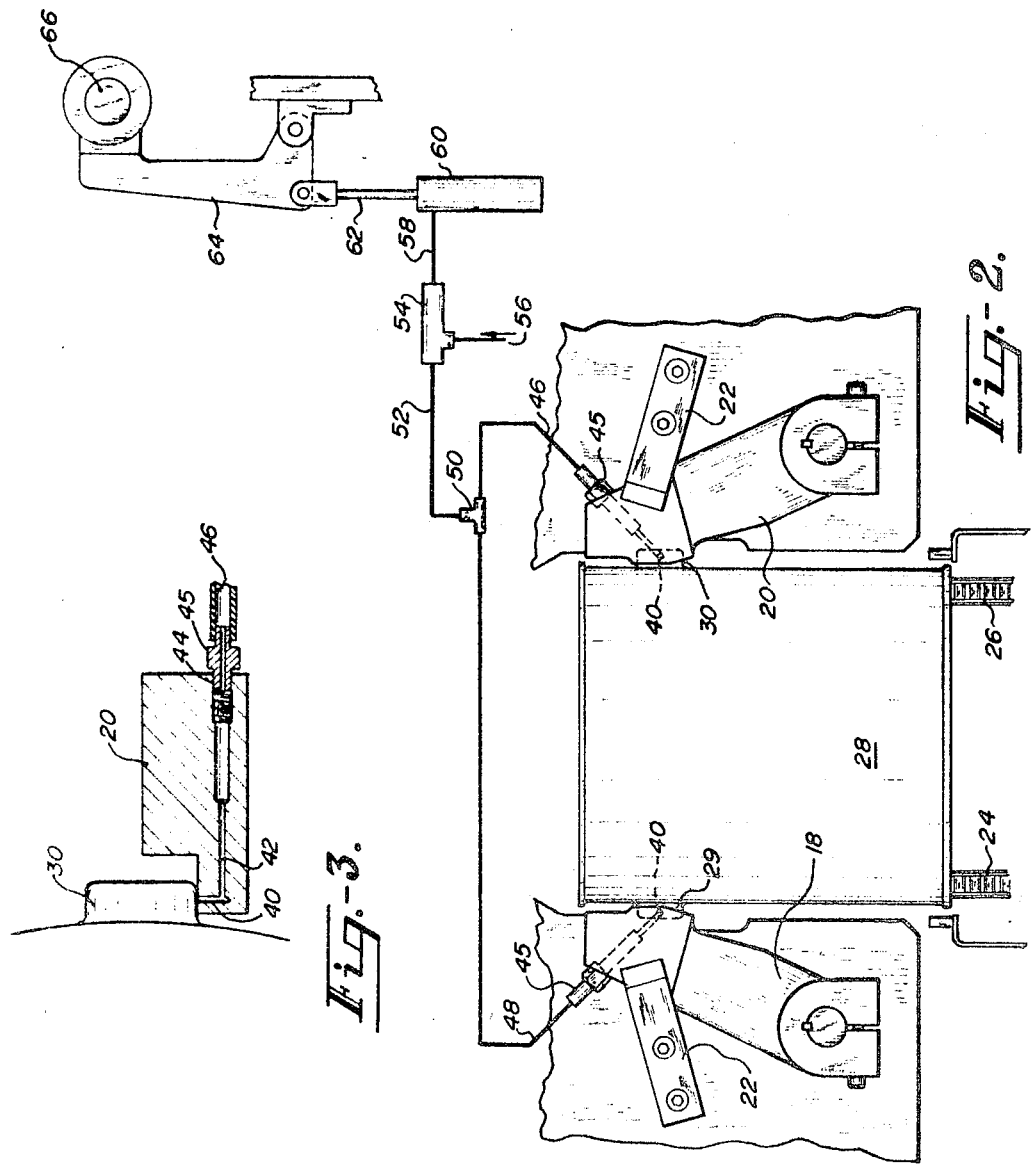
INVENTOR.
RAYMOND A. HEISLER
BY
Ralph R Roberts
AGENT.

United States Patent Office 3,464,462
Patented Sept. 2, 1969

3,464,462
EAR INSPECTION AND DETECTION APPARATUS
Raymond A. Heisler, 657 Dakota Trail,
Franklin Lakes, N.J. 07417
Filed Oct. 18, 1967, Ser. No. 676,226
Int. Cl. B21f 45/00
U.S. Cl. 140—93                          4 Claims

ABSTRACT OF THE DISCLOSURE

In an apparatus for forming and attaching wire bails to eared containers, an ear-detecting and position inspection apparatus adapted for actuation of the bail-applying apparatus by the engagement of an acceptably eared container. In the apparatus there is provided a pair of movable arms adapted to engage the ears of and stop the forward progress of an advancing eared container. Each of these arms is provided with a pneumatic discharge passageway whose port is precisely positioned so as to be closed by the forwardmost portion of an ear of an advancing container whereby an acceptably positioned ear is brought in the way of the pneumatic discharge port, the port is closed and a pneumatic actuation is provided to actuate a clutch of the bail-applying mechanism.

BACKGROUND OF THE INVENTION

Field of the invention

The field of art to which this invention pertains is in the general class of wire working and more particularly to the subclass of "applying wire," in which subclass is generally found those apparatuses adapted for the forming and applying of wire bails to eared containers. Also pertinent to this invention is the subclass of making bails under the general subclass of "article making or forming."

As an inspection for bail ear-attaching apparatus the field of art pertains to the general class of metallic receptacles and in particular to the subclass of "bail ears."

Description of the prior art

In my U.S. Patent 3,241,578 issued Mar. 22, 1966, there is shown apparatus for forming and applying bails on eared continers, which apparatus includes means for orienting and stopping an eared container in a precise position so that a wire bail may be formed and attached to an eared container.

As shown in this patent there is provided an ear sensing device adapted to engage an ear of an advancing container as this container is moved forwardly on a conveying means. In response to a signal from the sensing device, the bail-forming and applying apparatus is activated so that as the container is brought to a stop position in the bail-forming apparatus the ends of the bail are inserted into the ears of the container. The inaccuracies that are often found in the manufacture of eared containers provide problems in the high-speed forming and applying of bails to the eared container in that if the ear is misplaced beyond determined limits malfunctions of application occur. In particular, the lack of accuracy in the positioning of ears on the container oftentimes causes the formed bail to improperly engage or fail to engage the ear of a container so that this particular container is discharged from the bail-applying apparatus incompletely bailed. This usually requires, of course, an operation to remove the bail from one or both of the ears of the container and to rebail the container by means of a hand-applied bail. Insofar as is known, there has not been a simple automatic means providing for the precise inspection of the presence of and positioning of the ears of an eared container so that those containers having ears inaccurately positioned upon the container or missing therefrom are rejected by the apparatus without the applying of a bail. It is an intent of this invention to provide a simple pneumatic sensing device which not only detects the presence of an eared container in the apparatus at the time the bail is to be applied, but at the same time performs an inspection operation to determine whether the ears of the container are at an acceptable height and position.

SUMMARY OF THE INVENTION

This invention provides an ear sensing and inspection device which automatically determines an acceptable condition of an eared container preparatory to the applying of a bail thereto. This invention contemplates the modification of mechanism as shown in my U.S. Patent 3,241,578 of Mar. 22, 1966. In the present invention the cover stop arms shown in this patent are modified to carry and provide a pneumatic sensing device. This pneumatic sensing device replaces the ear-detecting apparatus as shown in FIG. 8 of the above-identified patent. In the invention to be hereinafter more fully described, there are provided in each of the cover stop arms of the bail-applying apparatus a precisely positioned pneumatic discharging aperture connected to a pneumatic circuit so that pressurized air is fed to each of these discharging apertures. When an eared container having two ears each acceptably positioned on the container comes in the way of the cover stop arms, the forwardmost portion of each ear comes in the way of said discharging apertures to close the apertures sufficiently to cause the flow of air to stop. This stopping of air flow actuates a pneumatic booster, which in turn is contemplated to actuate a clutch of the bail-applying mechanism to form and insert a bail into the ears of the eared container.

It is an object of this invention to provide a device by which an eared container may be inspected as to the presence of and acceptable positioning of each ear of the container.

It is a further object of this invention to provide an ear detection and inspection device in which a pneumatic actuation circuit includes a spaced pair of discharging ports in ear-engaging members, the ports positioned so as to be closed by the received presence of acceptably positioned ears of an eared container, the closing of both ports adapted to actuate other apparatus.

INTENT OF THE DISCLOSURE

Although the following disclosure offered for public dissemination is detailed to insure adequacy and aid in the understanding of the invention, this is not intended to prejudice that purpose of a patent which is to cover each new inventive concept therein no matter how it may later be disguised by variations in form or additions of further improvements. The claims at the end hereof are intended as the chief aid toward this purpose, as it is these claims that meet the requirement of pointing out the parts, improvements, or combinations in which the inventive concepts are found.

There has been chosen a specific embodiment of the ear-detection and inspection device for eared containers as adapted for use with a bail-applying apparatus or with other eared container handling apparatus. This specific embodiment is contemplated for use with a pneumatic signal sensing system and has been chosen for the purposes of illustration and description and is shown in the accompanying drawings wherein:

BRIEF DESCRIPTION OF THE DRAWINGS

FIG. 2 represents in an enlarged scale a fragmentary front view showing the cover arms of FIG. 1 arranged to engage the ears of an eared container, these arms have pneumatic means which are connected to a pneumatic system, said system being diagrammatically indicated and showing its adaption to control the actuation of the bail-applying mechanism, and FIG. 3 represents in an enlarged partly diagrammatic sectional view the construction of one cover arm with a pneumatic passageway formed therein with the outlet port adapted to engage an ear of the eared container.

DECRIPTION OF THE PREFERRED EMBODIMENT

Figure 1:
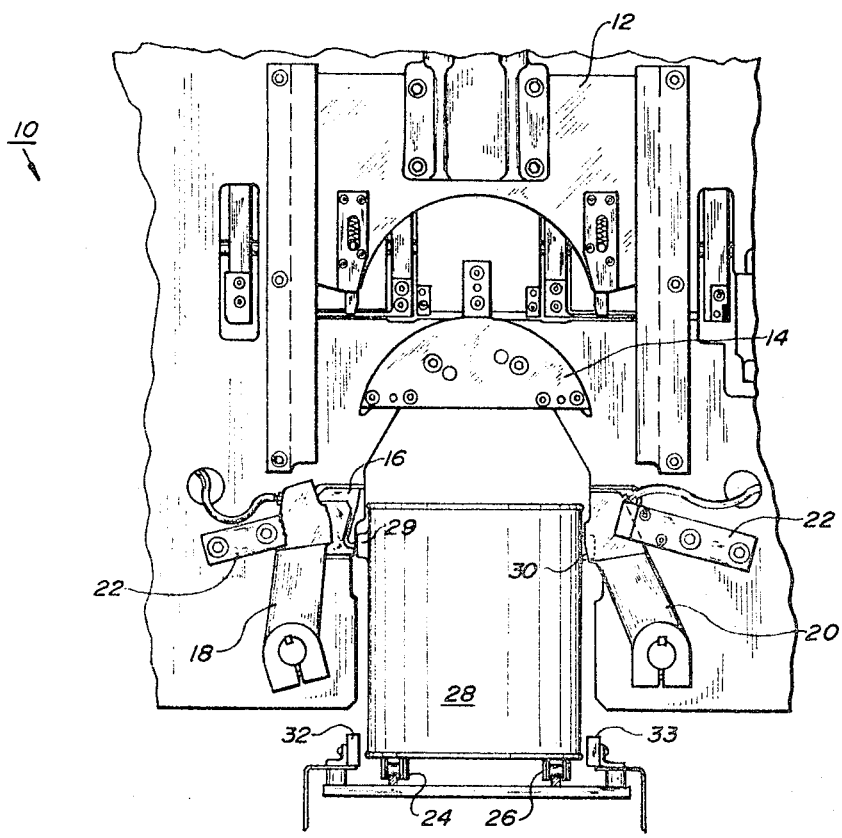
FIG. 1 represents a fragmentary front view showing a bail-applying apparatus with an eared container positioned therein and showing the cover arms having the fluid conductors of a pneumatic sensing device attached thereto as preferably disposed in the present invention.

Referring now to the drawings in which like numbers refer to like members throughout and in particular to FIGS. 1 through 3, it is to be noted in FIG. 1 that the bail-applying mechanism shown and described in my Patent No. 3,241,578 is indicated generally as 10. This bail-applying mechanism includes an upper die shoe 12 which mates with a lower die shoe 14 to form the U-portion of a bail and after forming, transports the bail downwardly towards and to curling dies 16. The curling die is covered by a cover arm 18 and a like opposite die is covered by cover arm 20, each cover arm movable behind a stop block 22. Carried on conveyor chains 24 and 26 is an eared container 28 having ears 29 and 30. This container is precisely guided and retained on the conveyor by means of side guides 32 and 33.

It is to be noted in FIG. 1 that the cover arm 18 is shown in the open position, whereas cover arm 20 is shown in the closed or ear-engaging position. However this showing is merely for illustration as the arms are simultaneously moved to either the open position of arm 18 or to the other limit of movement at the closed position of arm 20.

Referring next to FIG. 2, it is to be noted in this enlarged and detailed view that the container 28 as it is carried forwardly on the conveying chains 24 and 26 has its ears 29 and 30 brought in the way of cover arms 18 and 20, whereupon as the ears engage the cover arms the forward progress of the eared container is stopped.

Referring finally to FIG. 3 in conjunction with FIG. 2, it is to be noted that the ears of the container are contemplated as being generally dome-shaped with the circular cross-section of the mid-wall having its forward arcuate shape adapted to engage the cover stop arm at a particular tangent point. This tangent point is the selected position for the discharge port of a pneumatic passageway 40. This passageway which extends towards the rear with its port exit adapted to be obstructed by the ear 30 is best seen in FIG. 3. The passageway 40 is at right angles to a communicating passageway 42 which terminates with a threaded connection end 44 in the arm 20. There is mounted in this threaded connection end a connector 45 which conductively carries a flexible pneumatic conductor 46. A like penumatic arrangement is provided in the arm 18 whereby a connector 45 carries and is connected to a pneumatic conductor 48. These conductors extend to a T 50 and from this T a fluid conductor 52 extends to a booster 54.

Booster 54 is supplied by pressurized air through conductor 56 and from booster 54 the high volume flow of pressurized air is through conductor 58 which is attached to pneumatic cylinder 60. The piston rod 62 of cylinder 60 is operatively connected to an arm 64 which is actuated to engage and release the clutch of crank shaft 66, which crank shaft operates the bail-applying apparatus 10.

Referring in particular to FIG. 2, it is noted that the passageways 40 in both arms 18 and 20 are contemplated as being precisely positioned at a determined distance above the conveyor chains 24 and 26. When the eared container is moved forwardly on the conveyor and to the apparatus, the ears of the container are brought into engagement with the arms 18 and 20 whereby the arcuate faces of the ears 29 and 30, respectively, cover the exit ports of passageways 40 in arms 18 and 20 to block the flow of air therefrom.

USE AND OPERATION

As shown in the drawings, above-described, eared containers 28 may be fed to and on a conveyor having a plurality of roller chains identified as 24 and 26. These chains are powered so that one chain travels at a faster rate of speed than the other chain. As shown in my above-identified patent, an ear of the container is brought in the way of an ear-engaging rail whereby the container is caused to stop its rotation and in this oriented position is fed forwardly. The eared container is thus conveyed to the bail-applying mechanism with the ears of the container at substantially right angles to the advancing path of the conveyor.

In the present invention it is contemplated that the timing sequence of the bail-forming and applying mechanism described in my U.S. Patent 3,241,578 will be modified or changed so that the wire being fed to the bail-applying mechanism will have been already advanced into the mechanism and also will have been cut and formed into a U-shape prior to the engagement of the eared container with the cover arms 18 and 20. The eared container as it moves into engagement with the cover arms brings the ears 29 and 30, respectively, in the way of the ports of passageways 40. When the ear blocks the port the low volume of air being discharged through this port is caused to stop. When the flow of air in both conductors 46 and 48 ceases, the flow of air in conductor 52 also ceases. When the flow of air through conductor 52 is stopped, the booster valve 54 is caused to shift so that the pressurized air from conductor 56 is permitted to flow through conductor 58 to actuate the cylinder 60. In response to this actuation the arm 64 is caused to move the clutch so that shaft 66 is rotated, whereby the ends of the bail are pushed through the curling dies and the bail is inserted into the ears of the container.

When an eared container having missing or unacceptably positioned ears is fed to the bail-applying apparatus, one or both of the ears fail to engage the cover stop arms so as to block the air discharge from the port of passageway 40. Both ports must be blocked to actuate booster 54, and failure to do so renders the bail-applying cycle inoperative, whereby the flow of this container through the mechanism may be handled in one of two different ways. A discharge device may be provided on the apparatus whereby the cover arms are moved back to release the rejected container to a discharge apparatus for moving the container in the way of a discharging means. Alternatively, the rejected eared container, which has one or both ears improperly positioned as to height or an ear missing, may be left in the apparatus and in the way of the incoming containers so that the flow of containers is stopped. In this condition the line operator is required to move to the bail-applying apparatus and remove this rejected container from the apparatus.

The selected positioning of the discharge ports in the arms insures that the ears of every container are at a determined height above the conveyor. This height is at the outlet point of the curling dies wherefrom the bail end is pushed into the ear. As reduced to practice, on apparatus adapted to bail one-gallon containers the pneumatic flow from the discharge port 40 is adapted to be closed by ears having a diameter of about three-quarters of an inch and which are positioned within one-sixteenth of an inch of the determined height.

The diameter of the ears for one-gallon containers is generally standard for the industry, however if size changes are made in the ear, the size of the port outlet may be changed from the approximately forty-thousandths of an inch diameter which is in the preferred embodiment. The face of the arm at port 40 may be contoured to partially nest the ear so as to increase the ability of the ear to close the port. The pressure of the air may be adjusted to be higher or lower and the actuation of the booster 54 may be changed to be more or less responsive to the ceasing of flow in conductor 52. These variables are readily adjusted to give the predetermined amount of variation of ear height which will be acceptable to the bail-applying apparatus. This simple ear detection, inspection and signal actuation device is virtually foolproof as the discharge of air from the ports 40 effects a cleaning action of any possible accumulation of dirt and the like in the ports.

The ear inspection and detection device above-described may also be used in other apparatus adapted to process eared containers. This is particularly so when the position or presence of an ear is important. Such a use, for example, is suggested for ear-applying apparatus wherein the above-described device may inspect the just-eared containers as to the presence of and position of ears. Packaging and like operations pertaining to eared containers may also profitably use this device.

Terms such as "in," "out," "up," "down," "right," "left" and the like are applied to the preferred embodiment of the ear inspection and detection apparatus as shown and described in conjuction with the drawings. These terms are used merely for the purpose of description and do not necessarily apply to a particular position in which the apparatus may be constructed or used.

The conception of the above-described ear inspection and detection apparatus and its application to eared container apparatus is not limited to the embodiment above-described but departures therefrom may be made within the scope of the accompanying claims and protection is sought to the broadest extent the prior art allows.

What is claimed is:

1. An ear inspection and detection apparatus for eared containers whereby is determined the presence of each of the ears on an eared container and the position of the ear in respect to a container support surface, said apparatus including: (a) a pneumatic conducting system including means for receiving a continuous supply of pressurized air and the like; (b) a booster valve in the system and adapted to receive the incoming pressurized air; (c) a pair of movable arm members having an ear-engaging portion, each carrying a fluid discharging port and connected by a conductor to the booster valve and with the arm in ear-engaging position each port is spatially positioned and sized so as to be substantially closed to the discharge of pressurized air when the forward arcuate surface of an acceptably positioned ear is brought in the way of the port, and (d) means for causing the arms to move to ear-releasing condition in response to the closing of the pair of ports and the cycling of the booster valve.

2. An ear inspection and detection apparatus as in claim 1 in which the movable arm member is a portion of a bail-applying mechanism, the arm movable to an impeding position so as to engage the ear of an advancing container and to remain in engaged position during the applying of a bail, after which the arm is movable from in the way of the ear to release the bailed eared container.

3. An ear inspection and detection apparatus as in claim 1 in which the port of each arm is connected to a fluid conductor, each of said conductors connected to a T-member, said T-member flow connected to the booster valve, a high-volume fluid conductor extending from the booster valve to the means for causing a further actuation, the booster valve adapted to feed a supply of pressurized air to the high-volume fluid conductor when the discharging ports of each arm are engaged and closed by acceptably positioned ears.

4. An ear inspection and detection apparatus as in claim 1 in which the ear-engaging member is positioned so that each discharging port is precisely positioned a determined distance above a conveying means whereby as an oriented eared container is advanced by the conveyor, each ear is brought in the way of the ear-engaging member and each ear at an acceptable height presents its forwardly arcuate surface so as to close the port and stop the flow of pressurized air therefrom.

References Cited

UNITED STATES PATENTS

| | | | |
|---|---|---|---|
| 2,625,061 | 1/1953 | Mansfield | 73—37 |
| 3,241,578 | 3/1966 | Heisler | 140—93 |

CHARLES W. LANHAM, Primary Examiner

LOWELL A. LARSON, Assistant Examiner

U.S. Cl. X.R.

73—37.5